Oct. 25, 1949.    D. D. ADAMS ET AL    2,486,091
CONTINUOUSLY FORMING FIBROUS MATERIAL
Filed Oct. 16, 1946    3 Sheets—Sheet 1
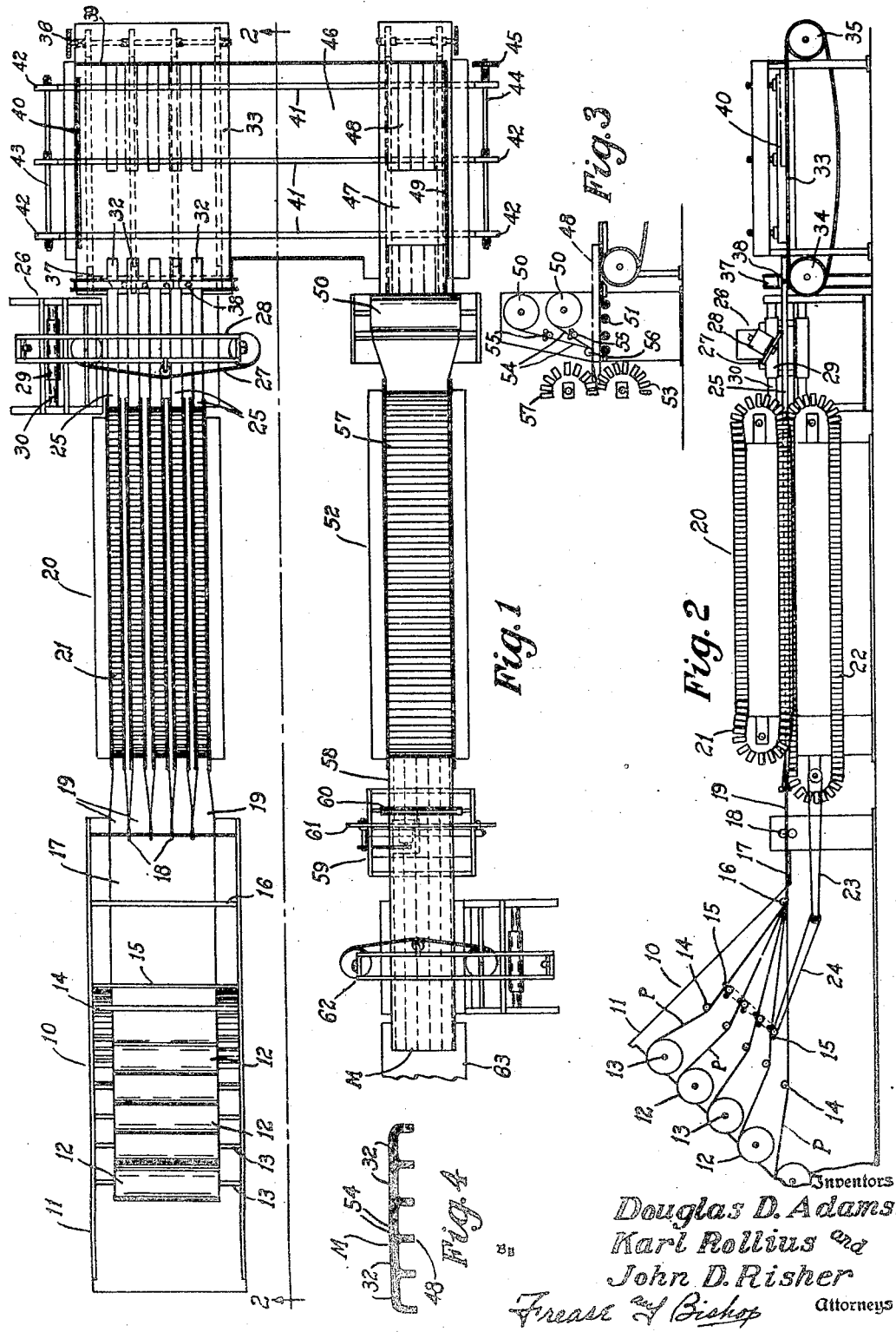
Inventors
Douglas D. Adams,
Karl Rollius and
John D. Risher
Freas and Bishop    Attorneys

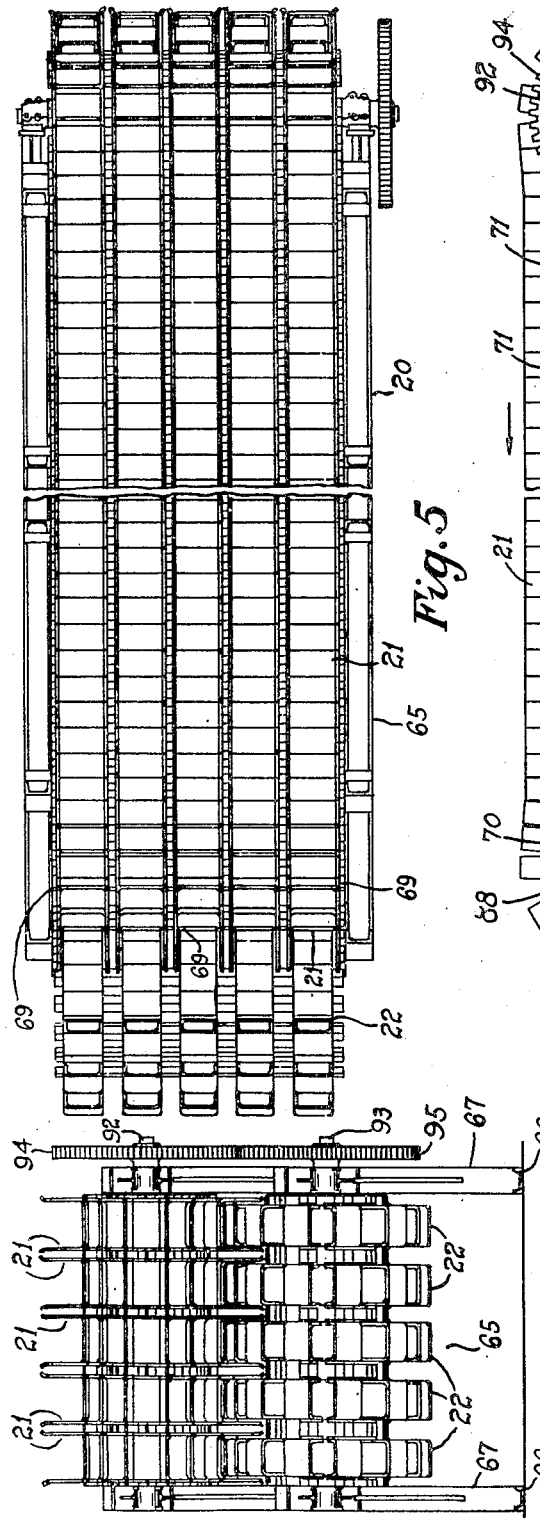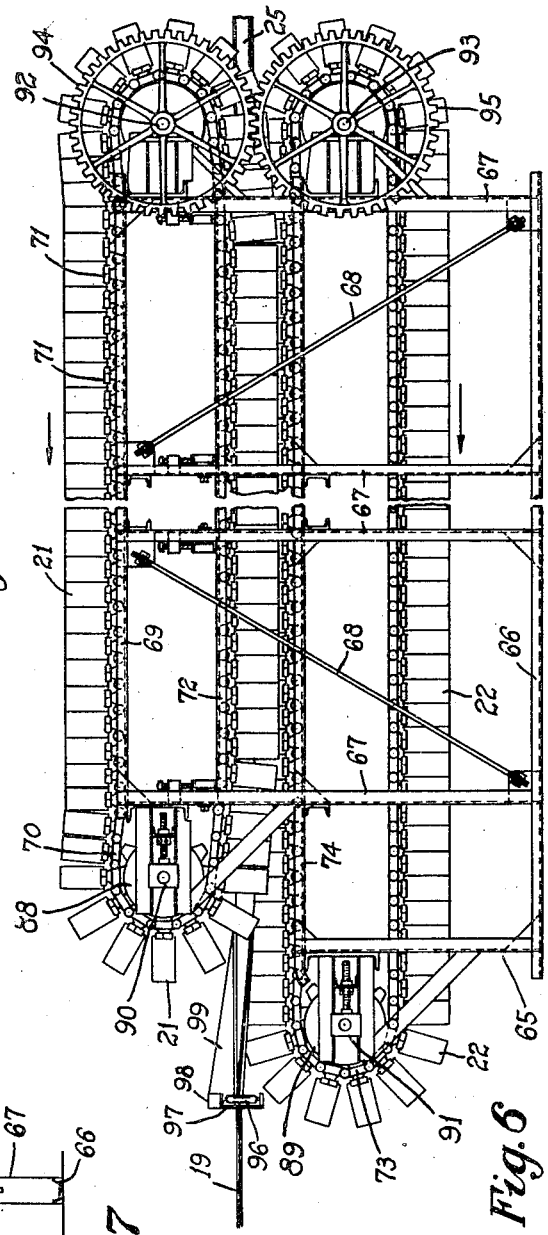

Oct. 25, 1949. D. D. ADAMS ET AL 2,486,091
CONTINUOUSLY FORMING FIBROUS MATERIAL
Filed Oct. 16, 1946 3 Sheets-Sheet 3
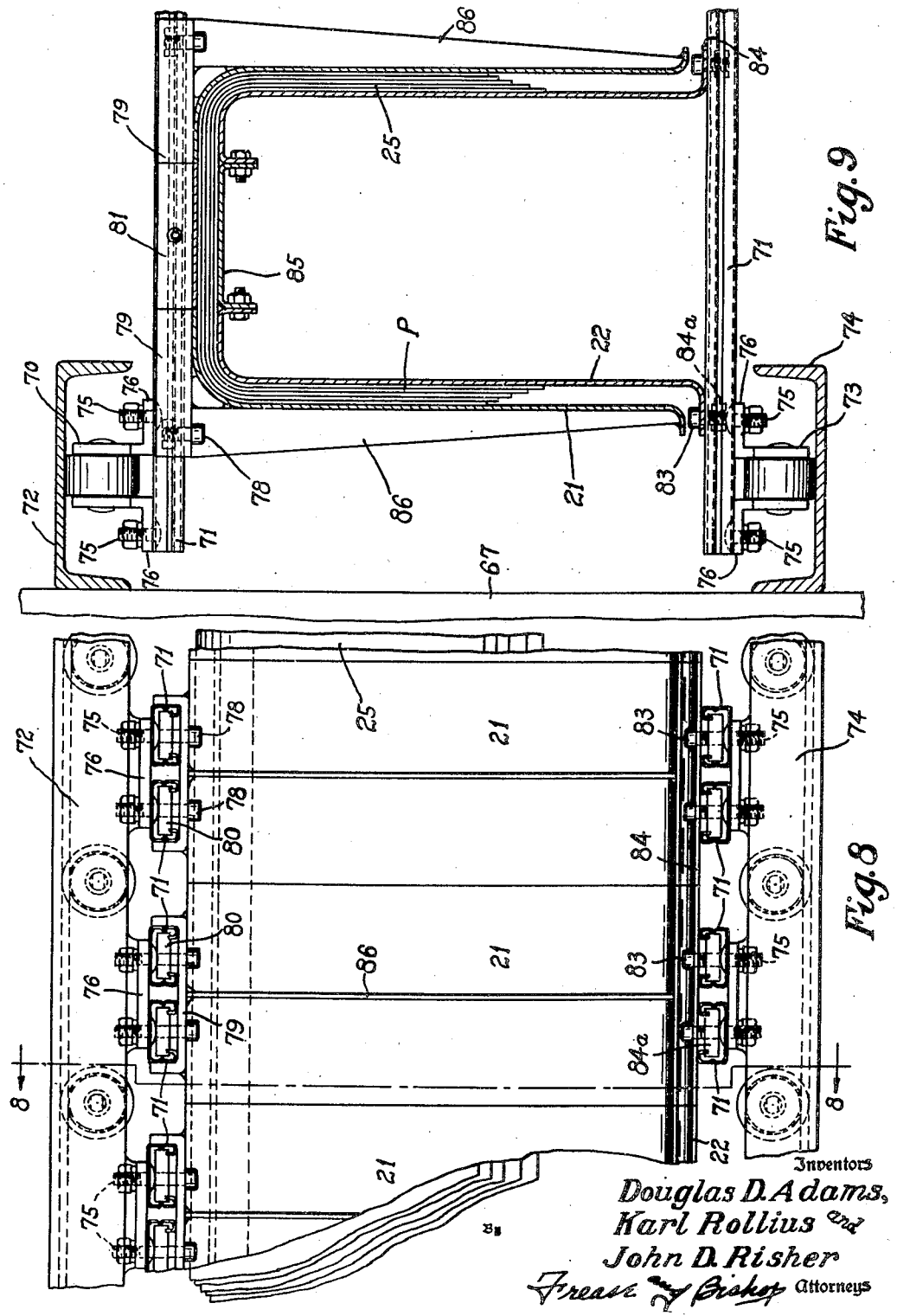
Inventors
Douglas D. Adams,
Karl Rollius and
John D. Risher
Frease and Bishop Attorneys Patented Oct. 25, 1949

2,486,091

UNITED STATES PATENT OFFICE 2,486,091

CONTINUOUSLY FORMING FIBROUS MATERIAL

Douglas D. Adams, Karl Rollius, and John D. Risher, Canton, Ohio, assignors, by mesne assignments, of 76.89% to R. E. MacKenzie and 23.11% to L. V. Bockius Application October 16, 1946, Serial No. 703,578

12 Claims. (Cl. 154—1)

The invention relates generally to the forming of flat fibrous material into angular or channeled shapes, and more particularly to the continuous forming of strips of fibrous material such as paper into laminated channel structures.

The forming of laminated fibrous material into various angular articles having, for example, a V-shape or a U-shape, ordinarily has been done piece-by-piece by pressing plies of fibrous material, such as corrugated paper, between suitably shaped dies to form or bend the plies into the desired contour. The plies may have their adjoining surfaces coated with plastic adhesive adapted to set during the die forming operation so as to maintain the formed shape permanently.

Attempts have been made to form fibrous material continuously by pulling the material through stationary forming dies, but the extent to which a fibrous material like paper can be shaped in such manner is very limited due to its low ductility and tensile and compressive strength. The difficulties of so forming several plies of paper simultaneously are proportionately multiplied.

Moreover, where plies of corrugated paper are to be shaped, it becomes all the more difficult to produce the desired shape without excessively crushing the corrugations and causing wrinkling or buckling of the paper plies. Certain prior constructions have provided means for continuously feeding plies of corrugated paper between forming dies, one of the dies being a suitably shaped stationary trough and the other die being a series of movable die blocks. Because of the resulting sliding of the plies on the stationary die, it was found necessary to provide traction rolls for gripping the strips to feed them through the dies, and the rolls were driven at progressively accelerated speeds to keep the strips under tension and prevent them from buckling or wrinkling.

Obviously, such devices require careful adjustment in order to effect sufficient tension to prevent buckling without producing too much tension and causing breaking or tearing of the paper strips, and the apparatus accordingly was very complicated and expensive, as well as very difficult to operate for producing a satisfactory product.

To our knowledge, no prior constructions have been successful in forming continuously a satisfactory laminated angular or channel product of fibrous material, and particularly such a product having several plies of corrugated paper. Moreover, when the idea of making such products continuously was proposed by us, various engineers in the art stated that the idea could not be accomplished in a practical manner to produce commercially a satisfactory product.

It is a general object of the present invention to provide novel and improved methods and apparatus for the continuous production of formed laminated fibrous material from flat strips.

More specifically, it is an object to provide novel and improved apparatus for continuously forming paper strips into laminated angular or channeled shapes.

Another object is to provide novel and improved methods and apparatus for continuously forming laminated corrugated paper structures having a multiple channel construction.

A further object is to provide novel and improved methods and apparatus for continuously forming plies of paper into a structure having a plurality of laterally abutting laminated channels within a laminated master channel.

A still further object is to provide novel apparatus for forming plies of fibrous material continuously into a laminated angular shape, without requiring additional means for feeding the material through the apparatus under tension.

Finally, it is an object of the present invention to provide novel and improved methods and apparatus for overcoming the disadvantages of prior constructions for continuously forming laminated fibrous material, and for accomplishing the foregoing objectives in a simple, practical and economical manner.

These and other objects are accomplished by the parts, constructions, arrangements, combinations, sub-combinations and methods which comprise the present invention, the nature of which is set forth in the following general statement, a preferred embodiment of which is set forth in the following description and illustrated in the accompanying drawings, and which is particularly and distinctly pointed out and set forth in the appended claims forming part hereof.

In general terms, the invention may be stated as including methods and apparatus for carrying out the operations of passing a plurality of corrugated paper strips over gluing rolls and superimposing the strips, preferably longitudinally slitting the laminated strip into laterally adjacent laminated strips and passing them between sets of continuously moving upper and lower individual forming dies which shape the strips into channels and at the same time grip the laminated strips to feed them forward continuously, then cutting the formed channel strips to length and gluing their adjacent surfaces, abutting the formed channels together laterally and overlaying them with glue coated plies of fibrous material, then passing the formed channels and overlying plies between continuously moving sets of upper and lower individual dies for forming the overlying plies around the channels and at the same time feeding the formed laminated multiple channel structure forwardly through means for cutting the structure to the lengths of the previously formed channels.

Referring to the drawings forming part hereof, in which a preferring embodiment of the apparatus of the invention is shown by way of example—

Figure 1 is a diagrammatic plan view showing a line of equipment for continuously forming a laminated multiple channel structure from a plurality of plies of fibrous material;

Fig. 2 is a side elevation, partly in section, as on line 2—2, Fig. 1;

Fig. 3 is a fragmentary side elevation of a portion of the apparatus in Fig. 1;

Fig. 4 is an enlarged cross sectional view of one form of multiple channel which is made by the improved apparatus and according to the novel method;

Fig. 5 is an enlarged plan view of the apparatus of Fig. 1 for forming continuously a plurality of laminated channels simultaneously;

Fig. 6 is a side elevation thereof;

Fig. 7 is an end elevation thereof;

Fig. 8 is an enlarged fragmentary side elevation of the sets of forming dies; and Fig. 9 is a fragmentary transverse sectional view thereof.

Similar numerals refer to similar parts throughout the several views of the drawings.

The apparatus diagrammatically shown by way of example preferably includes a paper feed unit indicated generally at 10 at the beginning of the line of equipment. The paper feed unit preferably has a frame 11 adapted for mounting a plurality of rolls of fibrous material, one for each ply of the channels to be formed. The several rolls are indicated at 12 and may be rolls of standard corrugated paper as purchased from the manufacturer.

The rolls 12 are mounted on suitable shafts 13 journaled in the frame 11 one above another, so that the paper P may be led from each roll under suitable idler rolls 14 and thence through gluing roll assemblies 15 which coat the adjacent surfaces of the paper plies, in a well known manner. The plies P are brought together after passing through the gluing rolls and superimposed and glued to each other by passing them under a guide roll 16, so as to form a laminated strip 17 having a plurality of plies, which in this case are five in number.

The laminated strip 17 is then slit into a plurality of longitudinal strips, by passing the strip between suitable rotary slitters 18 which may, for example, slit the strip into five longitudinal strips 19 each having five plies glued together. Obviously, the number of strips 19 may be varied as desired, and the widths of some of the strips may be different from others so as to form narrow channels and wide channels. For the sake of simplicity, the drawings show the strip 17 slit into five strips 19 of equal width for forming five channels of equal size.

The five laminated strips 19 are next passed through a novel channel forming machine indicated generally at 20 where the strips are formed simultaneously and continuously into laminated five-ply channels. In the machine 20 each of the strips 19 is passed between sets of continuously moving upper and lower individual forming dies 21 and 22 respectively, which shape the strips into channel form and at the same time grip them to feed them forward continuously. The channel forming machine will be described in greater detail hereinafter, it being noted at this time that the forming dies 21 and 22 are carried on endless belts or chains, the lower chain being preferably operatively connected as shown in Fig. 2 to the gluing rolls 15, as by belts 23 and 24.

As the five laminated channel strips 25 pass out of the channel forming machine 20 they move continuously under a traveling cutter or saw, indicated generally at 26, for cutting all five channels to the required length as they leave the forming machine 20. Preferably, the cutter 26 may include a band saw 27 mounted on a frame 28 which is supported on a movable carriage 29 adapted to travel a short distance along the track 30 at the same speed as the channel strips 25 are moving. Suitable means are provided for swinging the saw 27 on the carriage 29 to bring the cutting edge of the saw into engagement with the strips in the position shown in Fig. 2 so as to simultaneously cut them to length. The cutting edge of the saw is then raised and the saw moved backwardly in a usual manner in position for making a new cut.

As the five channel strips 25 are cut off to the required length, forming the channels 32, the front ends of the channels are moved onto the rear end of a forwardly moving belt 33 which is supported on suitable pulleys 34 and 35 mounted on transverse shafts, one of which is a drive shaft having a drive gear or sprocket 36 which is operatively connected to suitable driving means such as an electric motor. As the channels 32 move onto the belt 33 they pass under a transverse gluing trough 37 which has depending outlets 38 between the channels and arranged to flow glue or liquid adhesive in a thin film over the adjacent legs of the channels.

When the channels 32 are carried forward by the belt 33 to the dot-dash position shown in Fig. 1 their front ends abut a stop strip or bar 39. For the purpose of moving the channels together laterally to bring their glued surfaces into abutment, and preferably at the same time moving the five channels laterally into a reversely moving line of equipment, a pusher bar 40 is provided for moving laterally across the top of the belt 33 and engaging the channels 32 when they abut the stop strip 39. The pusher bar may be suitably supported on spaced belts 41 carried on pulleys 42 which are mounted on shafts 43 and 44, the shafts being provided with a drive gear or a sprocket 45 adapted for being operatively connected to suitable driving means. The pusher bar 40 is adapted to push the five channels laterally off the belt 33 onto a transfer table 46 and then onto a belt 47 moving in the opposite direction to the belt 33.

Obviously, the channels 32 may be moved forwardly through a line of equipment aligned with the belt 33 instead of laterally thereof, if the space available makes a continuation of the line in the same direction more feasible.

As soon as the five channels 32, which are now glued together in one composite channel indicated at 48, abut a stop bar 49, the belt 47 then carries them in a reverse direction under paper feed rolls 50 and onto a conveyor table 51 or the like. The conveyor table carries the composite channel 48 into a continuous forming machine indicated generally at 52, in which the individual channels 32 are gripped by moving lower forming dies 53 while the paper strips 54 are led over suitable gluing roll assemblies 55 and superimposed under a guide roll 56, and then passed under moving upper forming dies 57 which form the two superimposed plies 54 into a master channel spanning the five channels 48.

The multiple channel structure 58 emerging from the other end of the forming machine 52 passes through a leg trimming machine indicated generally at 59 which may include an upper roller 60 for engaging the top of the multiple channel strip and a band saw 61 for trimming or evening the legs simultaneously of the five smaller channels and the two ply outer or master channel. From the leg trimming saw 59, the multiple channel strip passes under a traveling cutter or saw indicated generally at 62, which may be identical with the traveling saw 26, and is arranged to cut the multiple channel to the length of the previously cut channels 32, after which the multiple channels M may be moved onto a runout table 63.

The multiple channel structure thus continuously produced has a variety of uses, and may be impregnated with a strengthening compound, after which it becomes a load-bearing member having sufficiently high strength to serve as a pallet or material carrying platform or as a load-bearing member in a building wall or the like. Obviously, the arrangement and relative sizes of the various channels making up the multiple channel may be varied as desired to produce multiple channels to meet various requirements. Moreover, the channels produced on the channel forming machine 20 may be used separately, and the forming machine may be operated with sets of dies of different sizes and shapes to produce a plurality of different sizes and shapes of channels simultaneously, with the cross sectional contour varying from U to V shape, for example.

Referring to Figs. 5, 6 and 7, the channel forming machine 20 preferably includes a steel framework indicated generally at 65 having base members 66 and upright column members 67 preferably connected by diagonal tie rods 68. At their upper ends, the columns 67 support laterally spaced longitudinally extending channels 69 which serve as tracks for the upper runs of endless roller chains 70 which carry cross bars 71 which are U-shaped in cross section, there being preferably two of said cross bars supported on each link of the chain. Similarly, the lower runs of the upper chain 70 are guided by inverted channel tracks 72 supported on the columns 67, and the upper runs of lower chains 73 are guided in channel tracks 74, also supported on the columns 67. The cross bars 71 are carried on the links of the chain 73 in the same manner as on the upper chain 70.

As shown in Figs. 8 and 9, the bars 71 are secured to the links of the upper and lower chains 70 and 73 by means of bolts 75 which attach the bars 71 to angle brackets 76 on the chains. Each pair of bars 71 of the upper chain 70 carries a transverse row of U-shaped forming female dies 21, and the pair of bars 71 are spaced apart longitudinally of the machine in such manner that on the horizontal runs of the chain the forming dies 21 and 22 are in abutment longitudinally. Preferably, the dies 21 are removably attached to the bars 71 by means of bolts 78 passing through channel brackets 79 welded to the bottoms of the dies 21, the bolts 78 being threaded into nuts 80 which are supported within the bars 71. The nuts 80 are slidable along the bars 71 to permit moving the channel brackets 79 relative to each other and inserting different sized filler pieces 81, whereby the width of the dies 21 may be varied to accommodate channels of different widths.

Each pair of bars 71 on the lower chain carries a transverse row of male U-shaped forming dies 22, adapted for fitting within the dies 21 to form the plies P of corrugated paper into channel shape between the dies. The dies 22 may be removably attached to the bars 71 by means of bolts 83 which pass through angle flanges 84 on the outer ends of the legs of the dies 22, the bolts 83 being threaded into nuts 84a supported within the bars 71. The nuts 84a are slidable within the bars 71 to permit moving the legs of the dies 22 relative to each other for inserting different sized filler pieces 85 between the channel legs to vary the width of the dies 22.

As shown in Figs. 8 and 9, the forming dies 21 and 22 are preferably made of comparatively thin metal, and the dies 21 may have reinforcing ribs 86 extending vertically along their sides and connected to the channel brackets 79.

As indicated in Fig. 6, the roller chains 70 and 73 are supported at their ends on suitable sprockets, and the sprockets 88 and 89, at the entrance ends of the chains 70 and 73 respectively, have adjustable mountings indicated at 90 and 91 for adjusting the tension in the chains. Preferably, the entrance end of chain 73 projects rearwardly beyond the entrance end of chain 70 so that the laminated strips 19 passing into the machine are positioned on top of the dies 22 before they are engaged by the upper dies 21.

As indicated in Fig. 6, the sprocket shafts 92 and 93 for the opposite ends of the roller chains 70 and 73 have intermeshing gears 94 and 95 respectively, and one of the gears may be operatively connected to suitable driving means in a well known manner to drive the chains in the directions of the arrows.

As the laminated strips 19 pass into the forming machine 20 between the continuously moving upper and lower forming dies 21 and 22, each die 21, as it swings downwardly into position above a mating die 22, will grip the laminated material 19 against the mating die to form the material into the channel shape of Fig. 9, and at the same time, because the strip material is tightly gripped between the mating dies, it will be fed forwardly by the dies. This gripping, forming and feeding action takes place progressively along the strips of material as each pair of male and female dies come into mating relation, so that there is no sliding action of the strip upon either of the dies which would tend to cause wrinkling, buckling or tearing.

If desired, means may be provided for gradually preforming the strips 19 into substantially channel shape just before the strips pass between the mating dies 21 and 22. As indicated in Fig. 6, this preforming means may consist of edge rolls 96 located at the entrance end of the lower chain 73 and engaging the edges of the strips 19 to start turning them downwardly around the tops of the male dies 22. The rolls 96 may be journaled in channels 97 which are mounted for lateral adjustment on a transverse supporting bar 98. Means for holding the webs of the channel strips flat against the tops of the dies 22 at the entrance end of the lower chain may include tapered shoes 99 mounted on the bar 98 and extending forwardly for slidably abutting the tops of the strips 19.

The channel strips 25 are accordingly held in channel shape from a point near the entrance end of the machine where the dies first mate to a point near the exit end where the dies begin to separate. The length of time that the channel strips 25 are thus held in channel shape is calculated to be sufficient to set the glue or plastic adhesive between the contiguous surfaces of the several plies, so that by the time the channel strips 25 emerge the adhesive has set to maintain the strips in channel form permanently. During the forming operation, however, the plies of the channel strips necessarily slide somewhat with respect to each other, so that the bottoms of the legs are uneven as shown in Fig. 9, and are later trimmed in the leg trimming saw 59, previously described.

If the channels 32 which are cut from the channel strips 25 are intended to be used separately, they may be removed from the line immediately following the cut off saw 26, but if a multiple channel is desired, then the adjacent sides of the channels 32 are coated with adhesive by passing them under the trough 38 and then abutted together by the pusher bar 40 into the composite channel 48 in the manner previously described. The channel forming machine 52 is similar to the channel forming machine 20 with the exception that the upper female dies 57 have a width sufficient to span the composite channels 48, while the lower male dies 53 fit into the individual channels.

Thus, the composite channels 48 are held in their preformed shape by the lower male dies 53 during their entire travel through the machine 52, and the upper female dies 57 progressively grip the overlying plies 54 and form them around the multiple channels 48 in the form of a master channel spanning the individual channels. Since the undersurface of the bottom ply 54 has been coated with plastic adhesive by the lower gluing roll 55, the master channel will adhere throughout its undersurface with the composite channels, and the adhesive will become set during the passage of the channels through the forming machine 52 to maintain permanently the formed shape of the multiple channel M.

The channel shape of the forming dies 21 and 22 in machine 20, and dies 57 and 53 in machine 52, is sufficiently curved at the corners so that the laminations of corrugated paper are not materially crushed during the forming operation. Also, the male and female dies are spaced apart in mating position a distance calculated to allow the dies to grip the laminations and feed them forwardly without crushing or wrinkling the material.

In the foregoing description, certain terms have been used for brevity, clearness and understanding; but no unnecessary limitations are to be implied therefrom beyond the requirements of the prior art, because such words are used for descriptive purposes herein and are intended to be broadly construed. For example, the term "channel" is intended to include any trough-like shape having flanges or legs.

Moreover, the embodiment of the improved construction, is illustrated and described herein by way of example, and the scope of the present invention is not limited to the exact details of construction, arrangements or configuration.

Having now described the invention, the construction, operation and use of a preferred embodiment thereof, the new and useful methods and apparatus, and reasonable mechanical equivalents thereof, are set forth in the appended claims.

We claim:

1. The method of continuously forming a multiple channel structure of laminated fibrous material, including gluing superimposed strips of the material together, slitting the laminated strip into laterally adjacent strips, progressively gripping the strips on opposite surfaces and forming them into channels while simultaneously feeding them forward continuously, laterally abutting the channels and gluing them together to form composite channels, passing said composite channels under overlying plies of fibrous material, and then progressively gripping the channels and overlying plies and forming the plies around the composite channels while feeding them forward continuously.

2. The method of continuously forming a multiple channel structure of laminated fibrous material, including gluing superimposed strips of the material together, slitting the laminated strip into laterally adjacent strips, progressively gripping the strips on opposite surfaces and forming them into channels while simultaneously feeding them forward continuously, laterally abutting the channels and gluing them together to form composite channels, passing said composite channels under a strip of fibrous material, and then progressively gripping the channels and overlying strip and forming the strip around the composite channels while feeding them forward continuously.

3. The method of continuously forming a multiple channel structure of laminated fibrous material, including progressively gripping laterally adjacent strips of laminated corrugated paper on opposite surfaces and forming ths strips into channels while simultaneously feeding them forward continuously, laterally abutting the channels to form composite channels, passing said composite channels under overlying plies of fibrous material, and then progressively gripping the channels and overlying plies and forming the plies around the composite channels while feeding them forward continuously.

4. Apparatus for continuously forming a multiple channel structure of laminated fibrous material, including means for feeding strips of the material continuously in superimposed relation to form a laminated strip, means for continuously applying adhesive to contiguous surfaces of said strips, means for continuously slitting said laminated strip into laterally adjacent strips, a plurality of sets of continuously moving mating dies arranged for progressively gripping opposite surfaces of said laminated strips and forming them into channels while feeding them forwardly, traveling cutter means for cutting said moving channels to length, means for applying adhesive to the adjacent surfaces of said cut channels, means for moving said channels into lateral abutment, means for continuously feeding a strip of said material over said abutting channels, and sets of continuously moving mating dies for progressively gripping the exposed surfaces of said strip and said channels to form the strip into a master channel spanning said abutting channels while feeding said overlying strip and abutting channels forward continuously.

5. Apparatus for continuously forming a multiple channel strcture of laminated fibrous material, including means for continuously feeding laterally adjacent laminated strips of the material forwardly, a plurality of sets of continuously moving mating dies arranged for progressively gripping opposite surfaces of said laminated strips and forming them into channels while feeding them forwardly, means for applying adhesive to the adjacent surfaces of said channels, means for bringing said channels into lateral abutment, means for continuously feeding a strip of said material over said abutting channels, and sets of continuously moving mating dies arranged for progressively gripping the exposed surfaces of said strip and said channels to form the strip into a master channel spanning said abutting channels while feeding said overlying strip and abutting channels forward continuously.

6. Apparatus for continuously forming a multiple channel structure of laminated fibrous material, including means for continuously feeding laterally adjacent laminated strips of the material forwardly, sets of continuously moving mating dies arranged for progressively gripping opposite surfaces of said strips and forming the strips into channels while feeding them forwardly, means for continuously feeding a strip of said material over said abutting channels, and sets of continuously moving mating dies for progressively gripping the exposed surfaces of said strip and said channels to form the strip into a master channel spanning said abutting channels while feeding said overlying strip and abutting channels forward continuously.

7. The method of continuously forming a plurality of elongated channels of laminated corrugated paper simultaneously, including applying adhesive to superimposed plies of said corrugated paper and gradually preforming them into elongated substantially channel-shaped strips, moving said strips forwardly in laterally adjacent relation, then while the adhesive is plastic progressively bending the side portions of each strip substantially at right angles to the web of the strip to form the strips into U-shaped channels, and simultaneously progressively gripping opposite surfaces of the strips to hold them in U shape as the adhesive sets and to feed them forward continuously.

8. The method of forming an elongated channel of fibrous material continuously, including applying adhesive to superimposed plies of said material and gradually preforming them into an elongated laminated strip having a generally channel shape, moving the strip continuously forword longitudinally, then while the adhesive is plastic progressively bending at least one side portion of the strip substantially at right angles to the web of the strip, and simultaneously progressively gripping opposite surfaces of the strip to hold it in channel shape as the adhesive sets and the strip moves forward continuously.

9. The method of forming an elongated channel of fibrous material continuously, including applying adhesive to superimposed plies of said material and gradually preforming them into elongated laminated strip having a generally channel shape, moving the strip continuously forward longitudinally, then while the adhesive is plastic forming said strip continuously into a U-shaped channel by progressively bending the side portions of the strip substantially at right angles to the web of the strip, and simultaneously progressively gripping opposite surfaces of the strip to hold it in channel shape as the adhesive sets and the strip moves forward continuously.

10. Apparatus for continuously forming an elongated channel structure of laminated fibrous material, including means for applying adhesive to superimposed plies of said material, guiding means for gradually performing said plies while moving continuously forward into laminated strip having a contour approaching channel shape, and two series of continuously moving mating dies having mating surfaces arranged for progressively gripping opposite surfaces of said preformed strip and bending the side portions thereof at right angles to the web of the strip to form the strip into a channel as the dies move said strip forward continuously.

11. Apparatus for continuously forming an elongated channel of laminated corrugated paper, including means for applying adhesive to superimposed plies of said paper, guiding means for progressively preforming said plies while moving continuously forward into a laminated strip having a substantially channel channel shape, a longitudinal series of upper forming dies, a longitudinal series of lower forming dies, means for moving said dies continuously in a longitudinal direction, and said upper and lower dies having U-shaped mating surfaces for progressively gripping said preformed strip and bending the side portions thereof at right angles to the web of the strip as the dies move the strip forward continuously.

12. Apparatus for continuously forming an elongated channel of laminated fibrous material, including an upper endless chain and a lower endless chain having its upper run adjacent to the lower run of the upper chain, means continuously moving said chains so that the adjacent runs move forwardly, a series of channel-shaped female dies removably mounted on said upper chain, a longitudinal set of male dies removably mounted on said lower chain, said male dies mating with said female dies to progressively grip and bend the side portions of a moving strip of said laminated material into a channel shape as the dies move with the strip, and guiding means for gradually preforming superimposed plies of said material into a laminated strip having a substantially channel shape as the strip enters said dies.

DOUGLAS D. ADAMS.
KARL ROLLIUS.
JOHN D. RISHER.

REFERENCES CITED

The following references are of record in the file of this patent:

UNITED STATES PATENTS

| Number | Name | Date |
|---|---|---|
| 1,852,451 | Everett | Apr. 5, 1932 |
| 1,909,513 | Agar | May 16, 1933 |

FOREIGN PATENTS

| Number | Country | Date |
|---|---|---|
| 793,163 | France | Nov. 7, 1935 |